United States Patent
Peters et al.

(10) Patent No.: US 6,385,637 B1
(45) Date of Patent: *May 7, 2002

(54) PERIODIC PROCESS TIMER

(75) Inventors: Michael Peters, Downers Grove; Paul D. Swardstrom; William W. Parker, both of Naperville, all of IL (US)

(73) Assignee: Rockwell Science Center, Inc., Thousand Oaks, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/915,707

(22) Filed: Aug. 21, 1997

(51) Int. Cl.⁷ .......................... G06F 9/00; G06F 11/30; H04M 3/22
(52) U.S. Cl. ................. 709/107; 379/265.03; 702/182; 713/502; 709/108
(58) Field of Search ................................ 709/107, 102, 709/108, 105; 395/701; 379/268, 269, 265.03, 265.06, 265.02; 702/182, 176; 717/4

(56) References Cited

U.S. PATENT DOCUMENTS

| | | | | |
|---|---|---|---|---|
| 4,142,238 A | * | 2/1979 | Brandt et al. | 340/526 |
| 4,790,005 A | * | 12/1988 | Hanselka et al. | 379/112.01 |
| 4,964,155 A | * | 10/1990 | Pinard | 379/136 |
| 5,164,983 A | * | 11/1992 | Brown et al. | 379/112.06 |
| 5,265,249 A | * | 11/1993 | Kumamoto | 717/4 |
| 5,448,533 A | * | 9/1995 | Owen | 368/47 |
| 5,500,795 A | * | 3/1996 | Powers et al. | 705/11 |
| 5,500,809 A | * | 3/1996 | Nakai | 702/176 |
| 5,664,167 A | * | 9/1997 | Pickett et al. | 713/502 |
| 5,978,832 A | * | 11/1999 | Sirkin | 709/107 |
| 6,083,280 A | * | 7/2000 | Eitel | 717/4 |

OTHER PUBLICATIONS

Stewart David B. "Measuring Execution Time and Real-time Performance", Embedded Systems Conference, Apr. 2001, pp. 1–15.*

Corti, Matteo et al. "Approximation of Worst-Case Execution Time for Preemptive Multitasking Systems" ACM 2000.*

Williams, Robin et al. "Jargon, An Informal Dictionary of Computer Terms", Jun. 1993.*

American Heritage Dictionaries. "Dictionary of Computer Words", 1995.*

(Microsoft) Microsoft. "MS Windows NT Workstation 4.0 Resource Guide" Chapter 9–11, Performance Monitoring, 1995.*

* cited by examiner

Primary Examiner—St. John Courtenay, III
Assistant Examiner—Lewis A. Bullock, Jr.
(74) Attorney, Agent, or Firm—Welsh & Katz, Ltd.

(57) ABSTRACT

A periodic process timer is incorporated into a multi-tasking operating system of an automatic call distributor system. The process timing method includes the steps of: a) initializing a plurality of accumulator values corresponding to a single process of a plurality of processes, each accumulator value defined to represent a total processing time for each process; b) recording a starting value of a counter device; c) activating the counter device prior to execution of a selected process; d) permitting the selected process to execute; e) stopping the counter device after execution of the selected process; f) reading and ending value of the counter device; g) determining a difference value between the starting value and the ending value in the counter device; h) adding the difference value of the counter device to the accumulator value corresponding to the selected process; i) continuously repeating steps (b) through (h) until a predetermined amount of time has elapsed, to obtain a total accumulator value representing the total processing time for each selected process; and j) saving the accumulator values for each selected process.

11 Claims, 2 Drawing Sheets

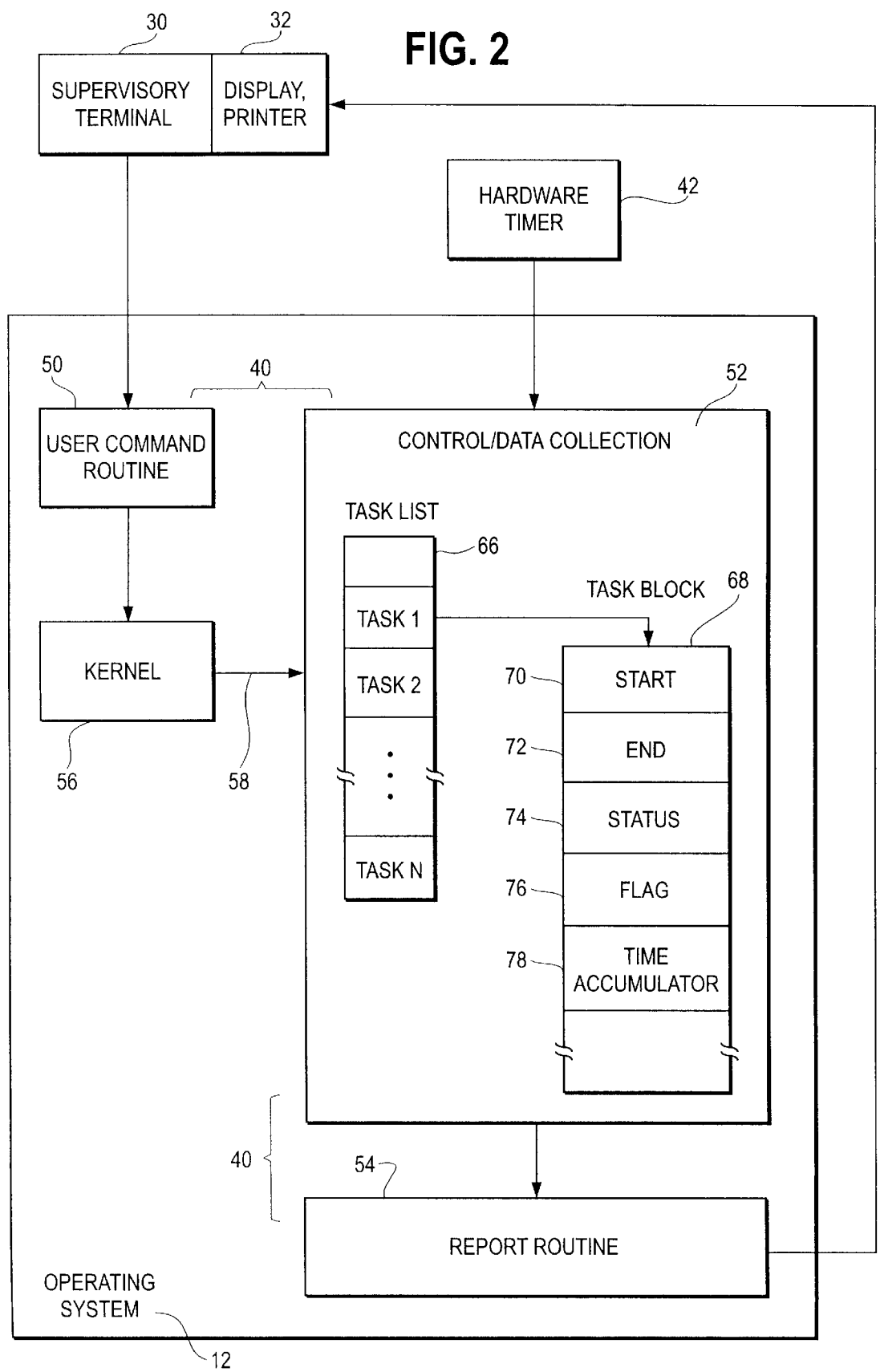

PERIODIC PROCESS TIMER

BACKGROUND OF THE INVENTION

The present invention relates generally to a method for timing computer processes or tasks and more specifically to a timing method for accurately timing software processes in a multitasking operating system of an automatic call distributor system.

Automatic call distributor (ACD) systems are typically used by businesses to automatically route incoming customer telephone calls to available sales agents. ACD systems generally include a multiport switch controlled by a central processing unit to interconnect external telephonic units of an external telephonic network with internal agent telephonic units. An example of such an ACD system is disclosed in U.S. Pat. No. 5,140,611 issued to Jones et al. on Aug. 8, 1992, entitled "Pulse Modulated Self-Clocking and Self-Synchronizing Data Transmission and Method for a Telephonic Communication Switching System," owned by the common assignee of the present patent. The disclosure of U.S. Pat. No. 5,140,611 is hereby incorporated by reference.

ACD systems include at least one central processing unit and often, include many distributed processing units located on various hardware circuit cards of the system. Usually, one processing unit is responsible for the execution of the operating system, although parallel processing permits multiple processors to "share" the execution of software tasks. For purposes of illustration only, the below-described subject matter will refer to a single central processing unit, although multiple processing units may be implemented. ACD systems are complex and are typically controlled by a real-time multitasking operating system. Real-time multitasking operating systems use various methods to allocate processing time among various tasks of the ACD. One known method of allocating time among the various processes is to perform a "context switch" at predetermined time intervals. For example, an interrupt occurring every ten to twenty milliseconds may be used to cause a context switch. That is, every ten or twenty milliseconds, the current task being executed is temporarily suspended and another task is begun. Usually, this occurs on a "time-slice" basis so that all tasks are eventually serviced. There are numerous known schemes used to further "fine-tune" the context switching, such as priority order, rotating priority order, round-robin switching or a combination of priority and round-robin scheduling. Additionally, some tasks may be designated as "non-interruptible" or "non-switchable" tasks during its entire execution time or a portion thereof, depending upon the critical nature of the task. Accordingly, real-time multitasking operating systems utilize an appropriate method for allocating computer processing time such that all software processes are permitted to perform their function.

However, known real-time multitasking operating systems may become overloaded or overburdened if required to perform too many tasks. In such a situation, response time will suffer which could lead to sluggish performance, system failures, or "crashes." In ACD systems, this may occur when the system is overloaded by routing more than a maximum number of telephone calls through the ACD system, adding too many agents, or requiring the system to perform additionally tasks, such as report generation, and diagnostics and the like that are beyond its capacity. To prevent overloading the ACD system, the processing time devoted to the processes must not be exceeded. By knowing the processing time devoted to each task, the engineers and technicians can monitor the available "processor power" to determine whether the central processing unit can adequately handle the required processes. This is particularly useful when additional system tasks are proposed but not actually implemented. This typically occurs when a customer wishes to know how the ACD system will perform given added burdens. A need exists for a method capable of determining whether the capabilities of an ACD system are approaching or have exceeded the processing limits of the central processing unit as additional burdens are placed on the ACD system in real-time. A need also exists for a method capable of determining which process in a multitasking operating system uses a disproportional amount of processing time.

The available processing power is determined by the combination of the type of computer, microprocessor, or "chip" used, the speed of the microprocessor (frequency or clock speed), the efficiency of the software instructions (number of operands per instruction, number of bits in the instructions), input/output structure of the system, frequency of interrupts and the interrupt structure, and the like. Additional tasks may be added to the system and the scope or frequency of existing tasks can be increased if sufficient processor power exists.

However, known methods for determining whether sufficient processing power exists to handle additional capacity in an ACD system are inadequate. Typically, the tasks or increased load are added to the ACD system and technicians monitor the system to determine if any adverse results follow. If the efficiency of the system is reduced by more than an acceptable amount, the tasks are removed from the ACD system until performance is acceptable. This is essentially a "trial and error" approach.

Another known method utilizes a software command that is executed on an interrupt basis, for example, every ten milliseconds. This method provides an indication of the available processing "power." Every ten milliseconds an interrupt occurs and an accumulator function is executed which simply determines which process was running at the time that the ten millisecond interrupt occurred. A software accumulator associated with that particular process is then incremented (e.g., a "tick" is added to the value in the accumulator). Each individual process or task has its own software accumulator and each tick in the accumulator represents an addition of ten milliseconds of time. Since the interrupt occurs every ten milliseconds., it is assumed that the interrupted process had been executing for ten milliseconds. Accordingly, its accumulator is incremented.

However, this method suffers from significant disadvantages. First, accurate timing cannot be achieved because the "granularity" or resolution of the timing function is too large. A relatively large value, for example, ten milliseconds, is used so as not to overburden the system with the accumulator process itself. If the accumulator process is executed too often (e.g., more than every ten milliseconds), it becomes part of the problem leading to sluggish system performance. Because of the large granularity, errors in time accumulate and become significant such that an accumulated time associated with a particular process is not an accurate reflection of the actual time devoted to the particular process. This known method is only adequate to identify a process that grossly and disproportionately uses processing time.

A second serious disadvantage of such a method is that the software accumulator for a particular process is only incremented if that process was running at the time that the ten millisecond interrupt occurred. For example, if process "A" was executing for five milliseconds, then process "B" was begun and the ten millisecond interrupt occurred, the software accumulator associated with process "B" is incremented while the software accumulator for process "A" is not modified because the accumulator function did not "know" that process "A" had been executed. This problem is referred to as a "boundary problem" and leads to serious distortions in the amount of execution time reported for each process. Thus, the engineer or technician cannot rely upon the information provided and cannot determine the source of the problem, assuming that the problem is not an obvious problem where one process is the continuous source of grossly disproportionate time consumption.

A third significant disadvantage of the above-described software accumulator function is that it must be executed on a demand basis. That is, a supervisor or engineer must cause the function to be executed by typing a particular key sequence on a supervisory terminal. This causes the accumulator function to be executed on an instantaneous basis. The accumulator function executes for a predetermined amount of time and the results are inspected. Thus, the engineer can only inspect the results of the accumulator function at that particular time. There is no facility to permit the accumulator function to continuously execute to identify a problem that occurs at a distant point in time. Such a accumulator function executing continuously would soon cause the software counters to overflow, rendering the results meaningless.

Another method used to determine the time allocated to various software processes is to use a hardware emulator. A hardware emulator is a separate, relatively bulky device having a "processor pod" attached to an "umbilical cord." The processor pod contains a microprocessor that physically replaces the existing central processing unit of the ACD system and "takes over" execution of the operating system. Typically, the microprocessor is identical to the central processing unit that it replaces. The emulator is used to set "breakpoints" which cause to the system to halt when particular software addresses are fetched or when particular registers or memory locations are loaded with user-defined values. Once the system is halted, the engineer can inspect various registers and memory locations and may be able to determine the time interval between preselected breakpoints. This system functions well within a narrowly defined window in time and provides extremely accurate timing information, often with nanosecond resolution.

However, the emulator is bulky and cumbersome and is not easily used in the field or at customer sites. Additionally, extension cards or extender cards must be used to permit attachment of the processor pod. Use of extension cards causes unusual timing anomalies and bus errors induced by added capacitance and increased wire length of the extension cards. Further, the central processing unit of the ACD system cannot be operated at maximum speed due to the use of the processor pod. Generally, the emulator system is adequate to isolate timing problems occurring during a small interval in time, on the order of a few seconds, where precise timing within those few seconds is required. However, the emulator system is not adequate to isolate system-wide loading problems where usage over a relatively long period of time is at issue. It is also not practical to use the emulator system in the field or at a customer site.

Accordingly, it is an object of the present invention to provide a novel timing method and apparatus to substantially overcome above-described problems.

It is another object of the present invention to provide a novel timing method and apparatus that measures and profiles software processes of a real-time multitasking operating system of an ACD system.

It is a further object of the present invention to provide a novel timing method and apparatus that measures and reports the run-time characteristics of a real-time multitasking operating system of an ACD system.

It is also an object of the present invention to provide a novel timing method and apparatus that executes continuously on demand and periodically reports timing results of software process execution of a real-time multitasking operating system of an ACD system.

It is still an object of the present invention to provide a novel timing method and apparatus that accurately performs timing measurements of software processes in real-time with a selectable timing resolution.

It is yet another object of the present invention to provide a novel timing method and apparatus that utilizes a hardware timing device that is accessed within the context switching point of a real-time multitasking operating system of an ACD system.

SUMMARY OF THE INVENTION

Disadvantages of present software timers and software timing methods are substantially overcome with the present invention by providing a novel periodic process timer. In one embodiment, the periodic process timer is selectively activated through a supervisory display or may be programed to be activated at a predetermined future time. Once activated, the periodic processor timer runs continuously until disabled by a command. Periodically, the process timer reports its results to a file to prevent timer overflow. The files or output of the periodic process timer are arranged and organized to provide the engineer or technician with accurate data representative of the execution times for each selected software process.

The periodic process timer, in one embodiment, is embedded in the system software or operating system, and the granularity or the resolution of the timing measurement may be modified at compile time. Alternately, the timing resolution may be, for example, programmable in real time. The software forming the periodic process timer is embedded in the real-time operating system at a central point referred to as the "context-switching" point. This is the single location in the operating system where processes are suspended and new processes are executed. Because only a single context-switching point exists, each software process is accurately timed, and no processes can execute without the periodic process timer software having access to its execution. Of course, the novel periodic process timer may still be implemented in an operating system having more than one context-switching point. In this situation, the periodic process timer software would be embedded at each point that context switching occurs.

The novel periodic process timer, in one embodiment, utilizes a hardware timing device in a manner similar to a stopwatch. When a software process is begun, the timer is cleared and started. When the process ends, the timer is inspected to determine the amount of elapsed time. The elapsed time is then added to a software counter or accumulator corresponding to the particular process or task. Each process to be monitored has a corresponding software counter. Periodically, at about an interval of one-hundred seconds, the results of the periodic process timer shown in the software counter or acevaulator are sent to or written to a file, for example, a disk file. The value of the software counters may be normalized or scaled so that the results are available to the engineer in a convenient format. Preferably, the number of bits provided by the hardware counter and the clock frequency supplied to the input of the hardware timer is sufficient to accommodate about two to six seconds of real-time recording. This represents the longest possible period of time that any one task may execute without interruption or a context-switch. However, most processes or tasks execute for a substantially shorter period of time.

The software counters or accumulators corresponding to each process preferably have a bit width sufficient to accommodate about one-hundred seconds of time. This means that about every one-hundred seconds, the value of the software counters are written to the disk file. This prevents counter or accumulator overflow. The files containing the accumulated values of the software counters may be separate or may represent a concatenated arrangement. In either situation, the periodic process timer may run indefinitely, limited only by the available disk space.

The novel periodic process timer is a significant development tool and sales aid. Often, customers desire to know, prior to purchase, certain performance characteristics of the ACD system. Additionally, customers and potential customers desire to know how a product will perform when certain environmental parameters are changed. Specifically, it is desirable to be able to predict performance characteristics when the number of incoming telephone calls is increased, when the number of agents is modified, when the duration of the incoming telephone calls is modified, and when customer-defined features are added. Such changes in the environmental parameters may significantly affect the performance of the ACD system. These environmental parameters may be changed during a simulation, as is known in the art. During such a simulation, the available or remaining processing capability may be monitored using the periodic process timer. The available processing capability of the ACD system provides an indication of how much additional burden the ACD system can effectively handle. Thus, the system response to new demands may be evaluated during operation of the ACD system.

The idle time of a microprocessor or central processor is usually designated as the lowest priority process or task since a processor is never truly idle, except in a "sleep" state. Accordingly, if the idle process or task is executing for a large proportion of the total processing time, excess capability exists, and the ACD system can clearly handle additional demands. A customer may desire to know how close the ACD system is approaching its maximum capacity as features are added. For example, the processing capability may be at a level of about 50%. The customer may then request an evaluation of the processing capability when new features are added or system loading is increased. In this situation, for example, the number of telephone calls can be increased or features added either by simulating the change, or subjecting the ACD system to such actual changes. Accordingly, the novel periodic process timer may then show, for example, that the processing capability has changed from 50% usage to 70% usage, indicating that the changes to the environmental parameters resulted in a 20% increase in processor load. This is reflected by a corresponding 20% decrease allocated to the idle-time process. Such a demonstration may convince a prospective customer that the product can meet current and future demands.

Similarly, the novel periodic process timer may be used as a field diagnostic tool to determine if an increase in environmental parameters has placed too much of a burden on an existing ACD system. When the processing time devoted to the idle-time process approaches a low value, for example, ten percent, as indicated by the periodic process timer, the customer may need to perform system modifications, such as reducing the number incoming telephone calls. Alternately, the customer may elect to increase the capabilities of the ACD system or upgrade the system by adding various hardware components to increase system capability.

More specifically, the periodic process timer, in one embodiment, may be incorporated into a multi-tasking control program executed by a computer. The multi-tasking control program manages the allocation of processing time for a plurality of processes. The process timing method includes the steps of: a) initializing a plurality of accumulator values, each accumulator value corresponding to a process of the plurality of processes, each accumulator value defined to represent a total processing time for each process; b) recording a starting value of a counter device; c) activating the counter device prior to execution of a selected process has terminated; d) permitting the selected process to execute; e) stopping the counter device after execution of the selected process has terminated; f) reading and ending value of the counter device; g) determining a difference value between the starting value and the ending value; h) adding the difference value to the accumulator value corresponding to the selected process; i) continuously repeating steps (b) through (h) until a predetermined amount of time has elapsed, to obtain a total accumulator value representing the total processing time for each selected process; and j) saving the accumulator values for each selected process.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings.

FIG. 2 is a data structure diagram of a specific embodiment of a periodic process timer, according to the present invention.

DETAILED DESCRIPTION

Figure 1:
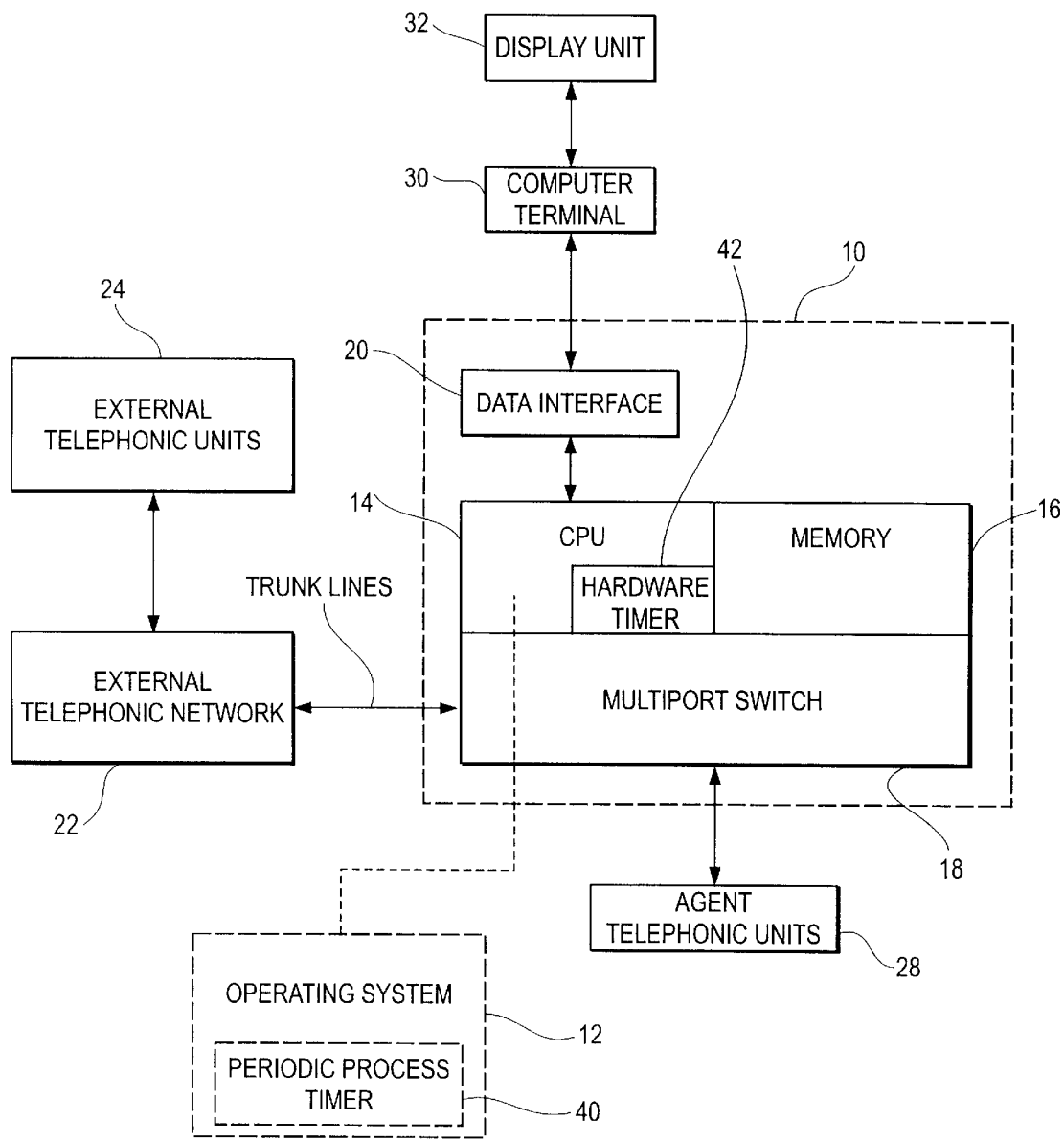
FIG. 1 is a hardware block diagram of an example of an ACD system.

Referring now to FIG. 1, a block diagram of an ACD system 10 is shown generally. The ACD system 10 is governed by software, referred to as an operating system 12, shown pictorially in dashed outline. The ACD system 10 includes a central processing unit 14, memory (RAM and ROM) 16, a multiport switch 18, and a data interface 20, as is known in the art. The ACD system 10 is connected through an external communication line (trunk lines) to an external telephonic network 22 to which a plurality of external telephonic units 24 are connected. The multiport switch 18 is in turn, connected to a plurality of agent telephonic units 28. Additionally, the ACD system 10 may communicate with a computer terminal 30 or supervisory terminal having a display device 32 or a printer.

According to one specific embodiment, a novel periodic process timer 40 is preferably implemented within the real-time operating system 12 of the ACD system 10. Preferably, the operating system 12 is a Model OS9 Multi-tasking Real-Time operating system produced by Mircoware Corporation. However, the present invention 40 may be implemented in any suitable multitasking operating system. In the embodiment illustrated in FIG. 1, a hardware timer device 42 is provided which is responsive to software commands that cause activation, deactivation, and clearing of the counter value within the hardware timer. The hardware timer 42 is preferably incorporated into the central processing unit 14, which may, for example, be a Motorola 68230 microprocessor. However, any suitable microprocessor or computer may be used which may include an integral timing device, or may access a separate and discrete hardware timer device. The hardware timer 42 is programmable as to its counting resolution, the direction of the count, preset values, carry and overflow conditions, and frequency input, as is known in the art.

The hardware timer 42 according to a specific embodiment is supplied with a clock frequency to create a desired count resolution or granularity and contains a sufficient number of bits to permit counting for a minimum amount of time. Preferably, the timer accommodates about two seconds of recording time, as this is the longest period of time that any process should occupy without a context switch occurring. This prevents "counter overflow." Typically, each process or task executes in a much shorter period of time.

For example, to count for up to two seconds with a resolution of one microsecond, the hardware timer will count up to the value of 2,000,000 (2 seconds/1 microsecond). This value represents an improvement in resolution of 10,000 times over that which is achievable using the ten millisecond timing method described previously. Accordingly, an input clock frequency supplied to the hardware timer 42 is about 1.0 MHz.

In order to count for up to two seconds with a resolution of ten microseconds, the hardware timer will count up to the value of 200,000 (2 seconds/10 microsecond). This value represents an improvement in resolution of 1000 times over that which is achievable using the ten millisecond timing method. Accordingly, an input clock frequency supplied to the hardware timer 42 is about 100 KHz.

Similarly, to count for up to two seconds with a resolution of one-hundred microseconds, the hardware timer will count up to the value of 20,000 (2 seconds/100 microsecond). This value represents an improvement in resolution of 100 times over that which is achievable using the ten millisecond timing method. Accordingly, an input clock frequency supplied to the hardware timer 42 is about 10 KHz.

The above values represent acceptable ranges of resolution and represents a "trade-off" between resolution and hardware bit-width availability. Preferably, ten microsecond resolution is used. Additionally, the input clock frequency supplied to the hardware timer 42 may be varied if different prescalers are used, as is known in the art.

The resolution, and hence the maximum timing duration of the time device 42, may be modified under software control in real-time. The user may select from a plurality of different resolution values in real-time just prior to enabling the periodic software timer 40. This provides added flexibility and convenience and permits the operator to tailor the system to particular timing requirements.

Referring now to FIG. 2, a simplified software block diagram of the operating system 12 is shown generally. The novel periodic process timer 40 includes a user command routine 50, a control and data collection routine 52, and a report routine 54. The operating system 12 includes a "kernel" 56, which is essentially the "heart" of the operating system. The kernel 56 is the portion of the operating system 12 where context switching occurs or where one task is suspended and a new task is initiated. Task switching at a single point within the kernel 56 is a feature common to most real-time multitasking operating systems and insures smooth transition from task to task and also facilitates proper allocation of processing time and other system resources among the multiple tasks. Complexity of the software is increased if more than one location in the kernel 56 handles task switching. Since the task switching preferably occurs at one point and only one point in the operating system 12, all tasks that execute can be monitored at that point.

This context switching point in the kernel 56 is accessed by a "hook" 58 that permits the control and data collection routine 52 of the periodic process timer 40 to access the operating system 12 so that all processes and tasks may be monitored and timed. The hook 58 is essentially a software branch or call instruction embedded in the kernel 56. The control and data collection routine 52 includes a task list 66 that lists every task or process that is to be timed. Preferably, all tasks are listed. The task list 66 is preferably allocated and defined during compile time or link time such that each task or process that is executed has its name or label entered in the task list. For each entry in the task list 66, a corresponding task block 68 is provided which further includes data specific to one individual task or process. For purposes of clarity only, a single task block 68 is shown. However it is understood that at least one task block 68 exists for each task or process.

Each task block 68 includes a starting time 70, an ending time 72, a status indication 74, a flag word 76, and a time accumulator 78. The starting time 68 indicates the time that a selected process is begun while the ending time 72 indicates the time that the selected process has ended. Alternately, the hardware timer 42 may be initialized to a value of zero prior to execution of a timed task so that only the ending time 72 is needed. The status indication 74 and flag word 76 are data needed by the operating system, such as branch-back addresses and error conditions. The time accumulator 78 may be composed of one or several memory locations depending upon the maximum value of the accumulated time. Preferably, the time accumulator 78 is between one and three words in size. Other data fields may be included in the task block 68 depending upon the application and particular operating system used.

When the control and data collection routine 52 is enabled, each task or process is timed. Supervisory personnel may enable or disable the periodic process timer 40 by using the supervisory computer terminal 30. By entering the appropriate command, the user command routine 50 is accessed such that operation of the periodic processor timer 40 may be selectively enabled and disabled. Additionally, the resolution of the hardware timer 42 may be modified at this time via the appropriate software command. Once the periodic processor timer 40 is enabled, data collection begins. Enabling the periodic process timer 40 may be done by setting a flag or by enabling the hook 58, as is known in the art. Alternately, the periodic process timer 40 may be programmed to be enable at a predetermined future time by entering the time to begin data collection. In this "automatic" mode, the user command routine 50 will not enable the control and data collection routine 52 until the proper time, based upon the real-time system clock of the operating system 12, as is known in the art.

Once the control and data collection routine 52 is enabled, each time accumulator 78 corresponding to each task is initialized or cleared. Each time accumulator 78 corresponds to one process or task performed by the operating system 12 and is configured to represent a total processing time for that process. Initialization or clearing of the time accumulators 78 is performed each time the control and data collection is enabled, and is also performed during execution of the report routine 54 where the values of the time accumulators 78 are written to a file or to disk, as will be described in greater detail hereinafter.

Next, immediately prior to execution of a new task, the hardware timer device 42 is initialized and activated. This permits the hardware timer device 42 to begin counting. The task or process then begins executing for a predetermined period of time, for example ten to twenty milliseconds. After a predetermined amount of time during which the selected process is permitted to execute, as determined by the time-slicing scheme of the operating system 12, the currently executing task is suspended in preparation for the next task. Accordingly, control returns to the task switching point in the kernel 56. At this point, the hardware timer device 42 is disabled or stopped and the counter value in the hardware timer is inspected. Because the operating system 12 initiates task switching from only one location within the kernel 56, the value of the counter in the hardware timer 42 accurately represents the time occupied by the task or process that just terminated execution. Of course, there is some small amount of "overhead" associated with the process of performing the control and data collection routine 52, but it is very small relative to the time occupied by the task or process being timed. Also, the overhead time is equal for all tasks so that a uniform value may be subtracted from the final accumulated times to achieve more accurate results.

Next, the value of the counter in the hardware counter 42 is added to the time accumulator value 78 corresponding to the selected process just completed. Each time accumulator 78 is of sufficient size such that no "wrap-around" occurs. Preferably, each time accumulator 78 is capable of storing a value representing about one-hundred to one-hundred and forty-five seconds. After each period of time that a task or process is executed by the operating system 12, the elapsed time represented by the hardware timer 42 is added to the time accumulator values 78 corresponding to that task or process. Accordingly, the value stored in each time accumulator 78 represents the total amount of processing time that the corresponding task or process used.

In systems which permit running tasks to be interrupted, the time devoted to the interrupt process may be erroneously attributed to the interrupted task. This causes a small degree of inaccuracy since during the interrupt, the process or task being timed is not really running. However, the degree of inaccuracy is extremely small because the time duration of the interrupting task is very short relative to the execution time of the task or process being measured. Such inaccuracy is also immaterial because interrupts occur relatively infrequently compared to the time devoted to the task being measured. Interrupts are the exception to the general rule that every task or process is centralized at the context switching point in the kernel 58. Interrupt functions are not considered to be tasks or processes subject to monitoring.

The above-described process is repeated until either supervisory personnel disable the periodic process timer 40 via a command, or until all of the time accumulators 78 are periodically saved to a file or to disk. If the periodic process timer 40 is executed for a period of time greater than the maximum value capable of being stored in the time accumulators 78, the time accumulator values must be periodically saved. This preferably occurs every one-hundred seconds. Of course, this time may be varied as long as the "saving" interval is shorter than the time corresponding to the maximum value capable of being stored in the time accumulators 78 so that no wrap-around occurs.

The report routine 54 gathers each of the time accumulator values 78 and saves the values to a file or to the hard disk. This is only limited by the size of the main memory of the ACD system 10 (FIG. 1) or the size of the disk. Practically, there is no limit to the duration that the periodic process timer 40 can remain active and enabled. Preferably, time-slicing or task-switching is inhibited while the report routine 54 saves the accumulator values 78 to the file or disk. Alternately, the accumulator values may be printed or displayed.

The value of one-hundred seconds is advantageous because this value permits the timing data to be easy viewed and understood by the technician. For a single activation of the periodic process timer 40 representing one-hundred seconds of monitoring, the sum of all of the task execution time is about equal to one-hundred seconds. In effect, this is a simple normalization technique where the time occupied by each process is easily viewed as a percentage of the total processing time. For example, if during the one-hundred second monitoring duration the total accumulator time representing task "A" is 7, the total accumulator time representing task "B" is 13, and the total accumulator time representing task "C" is 43, then it can be easily seen that tasks "A, B, and C" occupy 7%, 13%, and 43% of the processing time, respectively.

Further, it may be desirable to monitor the ACD system using the periodic process timer 40 for an extended period of time, for example, ten hours. This may be warranted if the ACD system 10 (FIG. 1) exhibits problems only during certain intermittent times where such times cannot be predicted. In this event, for example, the report routine 54 of the periodic process timer 40 would continue to save the time accumulator values 78 every one-hundred seconds. Accordingly, during a ten hour period of time, this would occur three-hundred and sixty times. A separate report generator may be used to further process the disk files to present the data in a more desirable or specific format.

Specific embodiments of a periodic process timer according to the present invention has been described for the purpose of illustrating the manner in which the invention may be made and used. It should be understood that implementation of other variations and modifications of the invention and its various aspects will be apparent to those skilled in the art, and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. A process timing method for a multi-tasking control program executed by a computer in an automatic call distributor system, the multi-tasking control program managing the allocation of processing time for a plurality of processes, the process timing method comprising the steps of:
   a) initializing a plurality of accumulators, each accumulator corresponding to a single process of the plurality of processes and defined to represent a total processing time for each process;
   b) initializing and activating a hardware-based counter device prior to execution of a selected process;
   c) permitting the selected process to execute;
   d) conditionally suspending the selected process and initiating a new process of the plurality of processes where an execution time of the selected process exceeds a predetermined processing time interval of the automatic call distributor;

e) stopping the counter device after a context switch based upon one of completion of the selected process and conditional suspension of the selected process;

f) reading the value of the counter device;

g) adding the value of the counter device to the accumulator value corresponding to the selected process;

h) repeating steps (b) through (g) until a predetermined amount of ACD system monitoring time has elapsed, to obtain a total accumulator value representing the total processing time for each selected process;

i) saving the accumulator values for each selected process in non-volatile storage; and j) formatting the saved accumulator values to provide an indication of the load capacity of the automatic call distributor system.

2. The process timing method according to claim 1 wherein the accumulator values are saved to a disk-based storage device.

3. The process timing method according to claim 1 wherein the accumulator values are saved in a plurality of memory locations.

4. The process timing method according to claim 1 wherein the control program provides a single central access point where a context switch for the plurality of processes is performed such that a length of time corresponding to the execution time of the selected process is determined at the central access point.

5. The process timing method according to claim 1 wherein a maximum timing capacity of the counter device is greater than a maximum time duration of the selected process.

6. The process timing method according to claim 1 wherein the accumulator values are saved at time intervals that are less than the maximum time represented by a value in the accumulator.

7. The process timing method according to claim 1 wherein a step of monitoring of the execution time of the selected process is selectively enabled and disabled by a user command.

8. The process timing method according to claim 1 wherein a step of monitoring of the execution time of the selected process is selectively enabled and disabled at a predetermined time by a user command.

9. The process timing method according to claim 1 wherein a resolution of the hardware timer is selectable via a user command.

10. The process timing method according to claim 1 wherein a maximum timing duration able to be timed by the hardware timer is selectable via a user command.

11. A process timing method for a multi-tasking control program executed by a computer in an automatic call distributor system, the multi-tasking control program managing the allocation of processing time for a plurality of processes, the process timing method comprising the steps of:

a) initializing a plurality of accumulators, each accumulator corresponding to a single process of the plurality of processes and defined to represent a total processing time for each process;

b) initializing and activating a hardware-based counter device prior to execution of a selected process wherein the hardware-based counter device is configured to receive a user-selectable resolution value;

c) permitting the selected process to execute;

d) conditionally suspending the selected process and initiating a new process of the plurality of processes where an execution time of the selected process exceeds a predetermined processing time interval of the automatic call distributor;

e) stopping the counter device after execution of the selected process has been one of terminated and conditionally suspended;

f) reading the value of the counter device;

g) adding the value of the counter device to the accumulator value corresponding to the selected process;

h) repeating steps (b) through (g) until a predetermined amount of ACD system monitoring time has elapsed, to obtain a total accumulator value representing the total processing time for each selected process;

i) saving the accumulator values for each selected process in non-volatile storage; and j) formatting the saved accumulator values to provide an indication of the load capacity of the automatic call distributor system.

* * * * *